ACCELERATING ANIONIC POLYMERIZATION OF LACTAMS

Adolf Steinhofer, Helmut Doerfel, and Georg Falkenstein, Ludwigshafen (Rhine), and Wolfgang-Dieter Jeserich, Lambsheim, Pfalz, Germany, assignors to Badische Analin- & Soda-Fabrik Aktiengesellschaft, Ludwigshafen (Rhine), Germany
No Drawing. Filed Jan. 15, 1968, Ser. No. 697,612
Claims priority, application Germany, Jan. 19, 1967, P 17 20 261.8
Int. Cl. C08g 20/00
U.S. Cl. 260—78    7 Claims

ABSTRACT OF THE DISCLOSURE

A process for accelerating anionic polymerization of lactams in the presence of alkaline polymerization catalysts and activators at from 80° to 200° C. in the presence or absence of inert solvents, in which N-(N′,N′-diphenylcarbamoyl)-lactams having four to thirteen members in the lactam ring are used as activators.

---

The invention relates to a method of accelerating anionic polymerization of lactams in the presence of catalysts.

It is known that polyamides may be prepared by polymerization of monomeric lactams in the presence of alkaline catalysts, for example alkali metals, such as sodium and potassium, or basic compounds thereof, such as amides or hydrides, the alkali metal lactam compounds or organometallic compounds of metals of Groups I–A to III–A of the Periodic Systems, at temperatures of more than 200° C.

It is also known that this method, generally known as anionic polymerization, can be carried out under considerably milder conditions in the presence of activators.

Prior art activators include acylated lactams, such as N-acetylcaprolactam, or compounds having an acylating action, such as isocyanates, ketenes, acid chlorides, carbodiimides, cyanamides and acid anhydrides, and also compounds which bear sulphonyl, phosphenyl, nitroso, thiocarbonyl or thiophosphenyl radicals on the lactam nitrogen atom.

The sensitivity of these compounds to water and oxygen makes it necessary however to carry out the process in anhydrous medium and in the absence of oxygen. It is therefore of little suitability for the polymerization of technical grade lactams which always contain small amounts of water.

Prior art activators also include carboxylic esters, urethanes and polyacylated amines. These compounds are less harmful physiologically than the abovementioned activators, some of which are strongly corrosive, but their accelerating effect is considerably less.

Finally it is known that anionic polymerization of lactams may be accelerated by the use of compounds having the general formulae: $(R)_2$—N—CX—N—$(R)_2$, $(R)_2$—N—CO—OR and

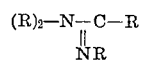

in which X denotes an oxygen or sulfur atom or the divalent group =NR and R denotes a hydrogen atom or any organic radical, at least one radical R attached to nitrogen denoting an organic radical. The active compounds are derived from the parent compounds (urea, thiourea, guanidine, urethane, amidine and isothiourea) by substitution of at least one hydrogen atom attached to nitrogen by an organic radical.

The object of the present invention is to provide a particularly advantageous method of accelerating the anionic polymerization of lactams in the presence of alkaline polymerization catalysts and activators at from 80° to 200° C. in the presence or absence of inert solvents. In accordance with the invention this object is achieved by using, as activator, a compound having the general formula:

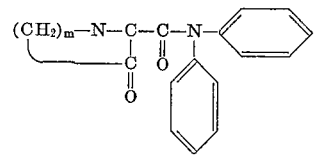

in which $m$ denotes one of the integers from 2 to 11. Compounds in which $m$ denotes one of the integers 5 and 7 are particularly suitable.

The advantage of the new activators over the prior art activators is that the conventional additives for regulating chain length are no longer necessary. Moreover the pot life and K value may be varied considerably.

Another advantage of the activators according to this invention is that they yield polyamides which have particularly stable terminal groups. They involve no health hazard and may therefore be used in the anionic polymerization of lactams without any special precautions.

The polymerization may be carried out by conventional methods. The components of the polymerization mixture may be brought together in any sequence.

The activators to be used according to this invention may be used in amounts of 0.01 to 15% by weight, preferably 0.5 to 5% by weight, with reference to the weight of the lactam to be polymerized. For special purposes, however, amounts which deviate from this range may be used. Obviously any mixtures of the new activators may also be used.

The polymerization may be carried out by a conventional method, advantageously at temperatures of from 80° to 200° C., preferably at from 100° to 160° C., although temperatures higher or lower than this range may be chosen for special purposes.

Prior art catalysts such as the alkali metals or alkaline earth metals, for example sodium, potassium and calcium, or their basic compounds, such as the amides or hydrides, alkali metal lactams or organometallic compounds of metals of Groups I–A to III–A of the Periodic Systems may be used as alkaline polymerization catalysts in the new process. Alkali metals and alkali metal compounds are particularly suitable.

Lactams which may be polymerized by this new process are generally lactams which contain a hydrocarbon radical in addition to the CONH group and whose rings consist of 5 to 13, particularly 7 to 13, preferably 7 to 10, ring members. They include pyrrolidone, piperidone, caprolactam, capryllactam, enantholactam, capric lactam, laurolactam, substituted lactams, such as epsilon-ethyl-epsilon-caprolactam, phi - ethyl - phi - enantholactam or methylene - bis - caprolactams which are known to be obtainable by reaction of methylene - bis - cyclohexanones with hydroxylamine followed by Beckmann rearrangement, or mixtures of the said compounds.

Polymerization may also be carried out in the presence of inert solvents such as aliphatic and aromatic hydrocarbons or ethers. In this case a polyamide powder is obtained which is suitable for example for the production of coatings by the fluidized-bed method, as clarifying agents for beverages or as a binder for nonwovens.

The polymerization mixture may also have incorporated into it soluble or insoluble dyes and fillers of all types provided they do not disturb the effect of the activator/catalyst system. These include the conventionally used plastics, inorganic substances such as glass fibers, asbestos and other ceramic materials, graphite, gypsum, chalk, molybdenum sulfide, natural substances, such as pretreated wood flour, and natural, synthetic or viscose fibers and the like.

The process may be carried out batchwise; it may also be carried out continuously, for example in tubes or towers having discharge means, such as spinning pumps or extruders. It is also possible to make tubes, rods, sheets, film, ribbon and the like and also filaments and threads, e.g. for tire cord, by methods which are not claimed in the present specification.

The process according to the invention is also suitable for making large blocks of polyamide or intricate moldings by melt casting, centrifugal casting or rotational molding techniques, for the production of foam articles, anticorrosive polyamide coatings or viscoelastic interlayers, or for bonding, sticking or laminating conventional materials. The polyamides obtained may also be granulated and then further processed by conventional methods, for example injection molded, extruded or spun.

The activators used in accordance with this invention are compounds which have not hitherto been described in the literature. The production of N-(N',N'-diphenylcarbamoyl)-caprolactam is therefore now described:

463 g. (2 moles) of diphenylcarbamoyl chloride is dissolved in 600 ml. of hot toluene. The solution is heated under reflux and a mixture of 226 g. (2 moles) of dry caprolactam and 202 g. (2 moles) of triethylamine (dried over potassium hydroxide) in 200 ml. of dry toluene is slowly added. The whole is then heated under reflux for another six to ten hours. The hydrochloride of the tertiary base which has been precipitated is filtered off while hot and the residue is washed several times with hot toluene.

The filtrate is concentrated in vacuo and the residue washed, first with cold distilled water, then with 5% sodium carbonate solution and then again with distilled water. The last traces of adherent unreacted diphenylcarbamoyl chloride may be removed by washing several times with hot cyclohexane.

After the product has been recrystallized from alcohol, colourless crystals are obtained which melt at 148° to 149° C.

The corresponding compound can be obtained by an analogous method from capryllactam; it has a melting point of 161° C.

The invention is further illustrated in the following examples in which parts and percentages are by weight.

EXAMPLE 1

43 parts of caprolactam and 7 parts of a 17% solution of sodium caprolactam in caprolactam are melted together and intensely mixed at 120° C. with a solution of 3 parts of N-(N',N'-diphenylcarbamoyl)-caprolactam in 48.1 parts of caprolactam. The mixture then begins to polymerize. After one minute and thirty seconds the product is viscous and after two minutes it is solid. The temperature of the mixture rises after two minutes to 170° C. The polymer has an extract content of 4.3%. The K value is very high. The polymer does not dissolve completely in 96% sulfuric acid. The mechanical properties of the polymer are given in the table below.

EXAMPLE 2

The starting materials used in Example 1 are mixed intensely at 150° C. The mixture is viscous after twenty-one seconds and solid after one minute and twenty-four seconds.

EXAMPLE 3

45 parts of caprolactam and 4 parts of a 17% solution of sodium caprolactam in caprolactam are fused together and mixed intensely at 120° C. with a solution of 1.5 parts of N-(N',N'-diphenylcarbamoyl)-caprolactam in 38.4 parts of caprolactam. The mixture begins to polymerize immediately. It is viscous after three minutes and three seconds and is solid after four minutes and forty-five seconds. The temperature of the mixture rises after four minutes and twenty-four seconds to 170° C. The polymer has an extract content of 4.3%.

EXAMPLE 4

43 parts of caprolactam and 7 parts of a 17% solution of sodium caprolactam in caprolactam are fused together and intensely mixed at 120° C. with a solution of 3.2 parts of N-(N',N'-diphenylcarbamoyl)-capryllactam in 48.1 parts of caprolactam. The mixture begins to polymerize immediately. It is viscous after one minute and ten seconds and is solid after one minute and thirty-six seconds. The temperature of the mixture rises to 170° C. after one minute and thirty-six seconds. The polymer has an extract content of 4.4%. The K value is very high; the polymer does not dissolve completely in 96% sulfuric acid. The mechanical properties of the polymer are given in the table below.

EXAMPLE 5

45 parts of caprolactam and 4 parts of a 17% solution of sodium caprolactam (in caprolactam) are fused together and intensely mixed with a solution of 1.6 parts of N-(N',N'-diphenylcarbamoyl)-capryllactam in 38.4 parts of caprolactam at 120° C. The mixture begins to polymerize immediately. It is viscous after two minutes and twenty-seven seconds and solid after three minutes and thirty seconds. The temperature of the mixture after three minutes and twenty-one seconds has risen to 170° C. The polymer has an extract content of 3.6%.

TABLE
[Mechanical properties of the polymers specified in Example 1 (column A) and Example 4 (column B)]

| | A | B |
|---|---|---|
| (1) Tensile test according to DIN 53,455: | | |
| (a) tensile strength in kg./sq. cm | 910 | 860 |
| (b) elongation in percent | 10.3 | 33.4 |
| (c) E modulus in kg./sq. cm | 46,300 | 42,900 |
| (2) Notched impact test according to DIN 54,453, (a) notched impact strength in cm. kg./sq. cm | 3.5 | 3.8 |
| (3) Hardness test by indentation test according to DIN 53,456: | | |
| (a) indentation hardness after ten seconds | 1,657 | 1,608 |
| (b) indentation hardness after 60 seconds | 1,619 | 1,566 |

EXAMPLE 6

91.1 parts of caprolactam, 3 parts of N-(N',N'-diphenylcarbamoyl)-caprolactam and 7 parts of a 17% solution of Na-caprolactam in caprolactam are consecutively dissolved in 900 parts of anhydrous paraffin oil at 140° C. while stirring. After stirring for four hours at 140° C. a granular precipitate is formed which is filtered off, washed with chloroform and then dried. The product has a K value of 104.5 (0.25% solution in concentrated sulfuric acid at 25° C.).

We claim:

1. In a process for accelerating anionic polymerization of lactams in the presence of an alkaline polymerization catalyst and an activator at a temperature of from 80° to 200° C. the improvement which comprises using as the activator a compound having the general formula:

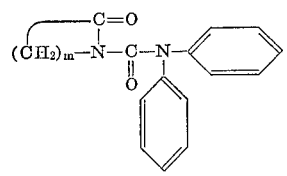

in which *m* denotes one of the integers from 2 to 11.

2. A process as claimed in claim 1 wherein the activator used is N-(N',N'-diphenylcarbamoyl)-caprolactam.

3. A process as claimed in claim 1 wherein the activator used is N-(N',N'-diphenylcarbamoyl)-capryllactam.

4. A process as claimed in claim 1 wherein the activator is used in an amount of 0.01 to 15% by weight based on the weight of the lactam to be polymerized.

5. A process as claimed in claim 1 wherein the activator is used in an amount of 0.5 to 5% by weight based on the lactam to be polymerized.

6. A process as claimed in claim 1 carried out at a temperature of from 100° to 160° C.

7. A process as claimed in claim 1 carried out in the presence of an inert solvent.

References Cited
UNITED STATES PATENTS 3,304,291  2/1967  Dachs et al. _____ 260—78L WILLIAM H. SHORT, Primary Examiner L. M. PHYNES, Assistant Examiner U.S. Cl. X.R.

260—239.3